Jan. 16, 1934.   D. E. GOMMEL   1,943,863
SAW SWAGE
Filed March 16, 1933   2 Sheets-Sheet 1

INVENTOR.
Dewey E. Gommel,
BY
Hood + Hahn
ATTORNEYS

Jan. 16, 1934.  D. E. GOMMEL  1,943,863
SAW SWAGE
Filed March 16, 1933   2 Sheets-Sheet 2
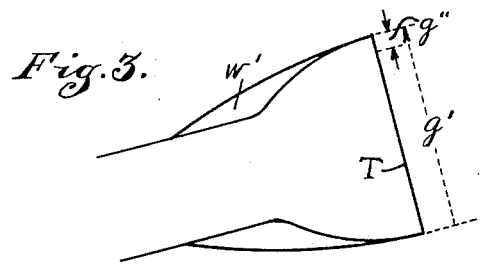
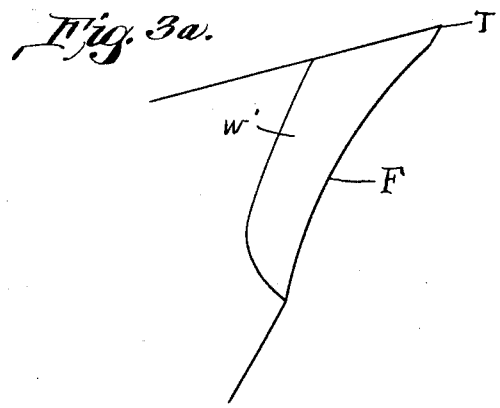
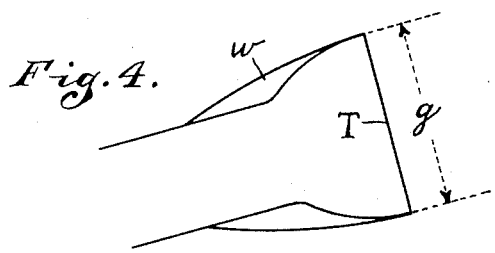
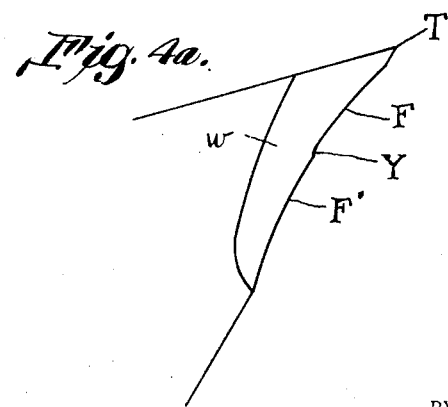
INVENTOR.
Dewey E. Gommel,
BY
Hood & Hahn.
ATTORNEYS Patented Jan. 16, 1934

1,943,863

UNITED STATES PATENT OFFICE 1,943,863

SAW SWAGE

Dewey E. Gommel, Indianapolis, Ind., assignor to E. C. Atkins & Company, Indianapolis, Ind., a corporation of Indiana Application March 16, 1933. Serial No. 661,021

6 Claims. (Cl. 76—54)

The object of my invention is to provide an improved saw-swage, embodying an improved die, by means of which the teeth of standard saws, particularly, such as circular, band and gang, may be more easily accurately swaged than heretofore.

The accompanying drawings illustrate my invention:

Figs. 3 and 3A are respectively diagrammatic plan and elevation, on an enlarged scale, of a properly swaged saw tooth;

Figs. 4 and 4A are respectively similar diagrams of a tooth which has been improperly swaged by a rubbing pressure insufficiently sustained.

Figure 1:
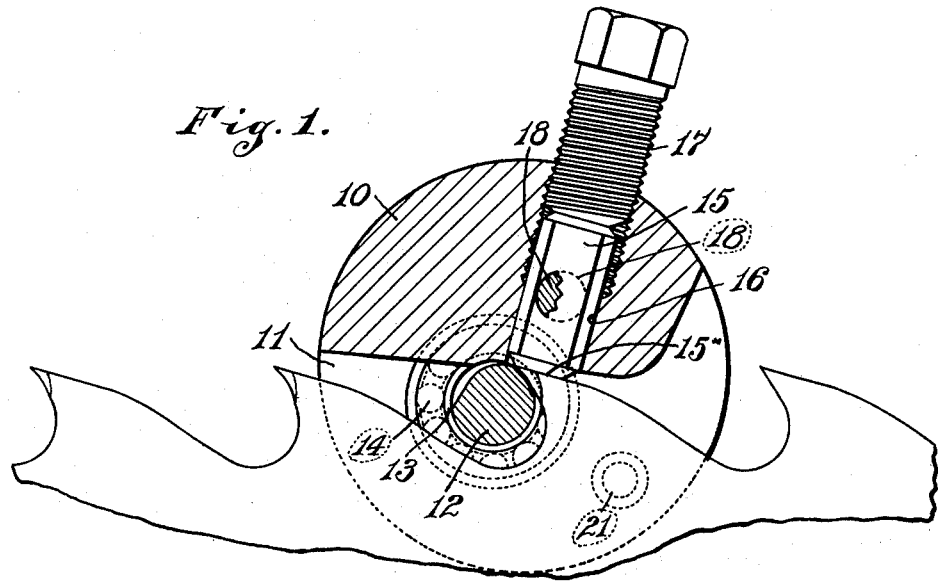
Fig. 1 is a transverse section of a swage embodying my invention.
Figure 2:
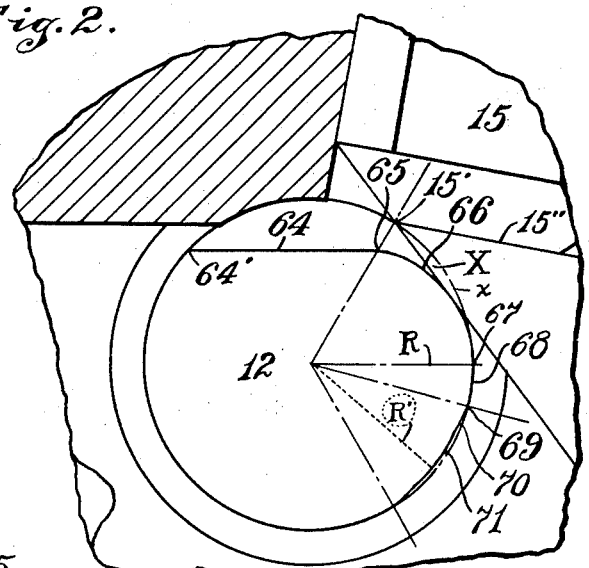
Fig. 2 is a diagram, on a considerably enlarged scale, of a transverse section of my improved die, and adjacent saw-tooth, anvil, and swage body.
Figure 5:
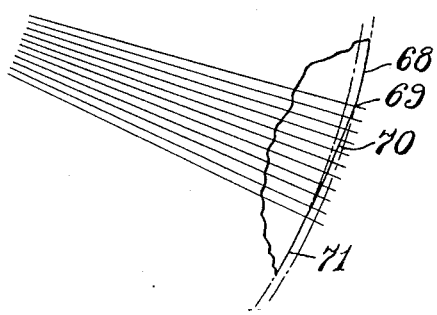
Fig. 5 is a highly magnified fragmentary diagram.

In the drawings 10 indicates the main body of a swage, transversely slit at 11 to receive the toothed edge of a saw, and transversely pocketed at each side of the slit, at right angles thereto, to receive roller bearings 14, having inner races 13.

Body 10 is pierced by a bore 16 in the plane of slit 11 and the anvil 15 lies in this bore backed by the usual backing screw 17 and held transversely by screw 18. The swage body is clamped upon a saw by clamping screws 21.

The main body 10 is provided with the usual supporting and positioning forks, gauges and accessories but these are not shown as they form no part of my present invention.

The parts thus far described are, or may be, of well known form and arrangement.

Axially adjustable in races 13, but normally axially fixed therein by the usual means, is my improved die 12 to one end of which is secured an operating lever of well known form, and therefore not shown.

The cross-section of the die, in that portion to be utilized for swaging operations, is novel, and preferably this cross-section is uniform throughout the length of the die for convenience of production and in use.

The die is fabricated from a piece having a circular cross section having a diameter which affords a close but free sliding fit into the inner races 13 of bearings 14 and this diameter is preferably as large as is practically permitted by the gullets of the saws upon which the swage is to be used. At one side, die 12 is flattened, as at 64, to facilitate attachment of the operating lever, and at one edge this surface 64 merges at 65 into a swaging cam 66 having an angular extent of about 60 degrees and tangentially merging into the cylindrical-arc, full-radius portion 68 which is preserved through an arc (about 15°) which is substantially less than the arc to be traversed on the material of the saw tooth in the necessary swaging operation. Beginning at the rear edge 69 of the full-radius portion 68 there is a surface 70 which is eased off by decreasing the radius at the rate of approximately 0.001 of an inch per angular degree and merging into a reduced, but uniform radius portion 71 having an angular extent from edge 67 at least a trifle greater than the arc to be traversed by swaging action on the saw tooth.

The difference between the radius R, of the main cylindrical surface of the die, and the radius R', of the portion 71, is less than the range of elasticity (i. e. spring-back) of the metal of the tooth radially of the die which will inherently follow the swaging effect of the segment 68 of the die, (as will be made to appear) but must be sufficient to reduce frictional resistance to turning of the die enough to permit accurate operation of the die by an average operator. When the swage is applied to a saw, a tooth is firmly held with its top (or back) edge firmly seated on the inner end 15'' of the anvil 15 and with its tip at or slightly beyond the corner 15' of the anvil, which corner, as previously stated, is set so as to coincide with the circle of travel of the full-radius portions of the die. Consequently the segment X of the tooth projects over the bore of the inner races 13 and when the die is rotated so as to force the edge 67 of segment 68 of the die to the anvil corner 15' the material composing segment X is displaced or "swaged" to new positions which result in a broadening of the tip T of the tooth.

The swaging operation compresses the metal of the tooth toward line 15' and arc $x$ but, said metal being elastic to some degree, it does not become permanently set as far back as arc $x$. The metal displacement back to arc $x$ is, of course, actually performed by surface 66 and corner 67 but, as surface 68 is advanced the displaced metal of the tooth presses back on surface 68 and this surface, resisting said pressure, tends to fatigue the tooth metal. As a consequence, the amount of permanent set in the tooth metal, approximating but never actually coinciding with arc $x$, will be a function of the elasticity of the tooth metal and of the duration and extent of resistance afforded by segment 68.

If segment 68 is too long, the pressure thereon by the tooth metal, as line 67 is moved toward and to line 15', offers so much resistance to advancement of the die that too much strength is required to turn it and average operators can not operate the tool accurately.

On the other hand, if segment 68 is too short there is not sufficient backing of the die immediately to the rear of line 67 and the die breaks down at this line after a few swaging operations.

Also, if the surface of the die immediately to the rear of segment 68 is relieved too much, especially within too small a circumferential distance from the rear end of segment 68, the tooth metal springs back behind segment 68 without being sufficiently laterally displaced and permanently set. This has been a long recognized deficiency in the action of such dies and an effort has heretofore been made to cure this defect by shortening segment 68 and fully relieving the surface of the die back of said segment a radial amount greater than the amount of spring-back (elasticity) of the tooth metal. However, such a die fails to properly support and laterally spread the tooth metal and produces such a swaging as is shown in Fig. 4 where the wedge-like backing, indicated at $w$, for the cutting tip of the tooth, is too short and does not make the cutting tip sufficiently strong.

I am aware that dies have been heretofore made and used wherein there is no relief back of the line 67 but, as stated above, accurate operation of such dies is practically impossible because of the frictional resistance to die turning.

As a result of long experimentation with dies of the two types mentioned above I have discovered that a wider gauge of swaging coupled with a longer, less abrupt backing wedge $w'$ (Fig. 3) may be produced with much less force applied to turn the die, by forming the die with the surfaces 70 and 71 as above described.

While I am not entirely sure as to the precise reasons for the differences in action of my die as compared with the actions of the other two dies which I have mentioned above, it seems to me that the difference is probably because the portion 70 retards the rate of spring-back of the tooth metal thus introducing an element of fatigue in the tooth metal, giving it time to spread laterally, and the portion 71 together with portion 70 prevents the tooth metal from flowing backwardly and gives it time to flow laterally.

Whatever the actual theory may be, I have found in actual practice that my improved die produces a much stronger swage of greater gauge with less effort than either of the other dies mentioned.

Practically all saws on the market are made of standard steel of uniform quality and therefore of the same elasticity and cold-plasticity and I have found that where the saw plate is 19 gage or more, best average results are obtained when the relief of surface 71 is approximately 0.010 inches, but where the gauge of the saw plate is less than 19 gage said relief should be approximately 0.0050 inches. In either case the best results appear to be obtained when the rate of relief of the segment 70 is approximately 0.001 inches per circumferential degree.

The relief of surface 71 should, in any event, be less than the range of elasticity of the tooth metal, which apears to be somewhat more than 0.010 inches.

The circumferential extent of portion 68 should be materially less than the length of arc $x$ but should be enough to furnish adequate backing for line 67 and in practice I have found that a circumferential extent of approximately 15° is desirable for this portion 68 though there may be some latitude as to this dimension.

The initial swaging cam 66, as is well known in the art should not be too abrupt and this portion of my die conforms to well known practice.

The distance rearwardly from line 67 to line 64' should be considerably greater than 180° so that the die will be firmly supported in the bearings.

Referring again to Fig. 4, which shows a tooth swaged by a die having too much clearance back of the full-radius swaging portion:—

It will, of course, be understood that dimensional differences of as much as 0.001 inch are of major importance and that, in this figure, it has been necessary, even though the scale is eight times natural size, to exaggerate certain features.

When a die is fully relieved back of the full-radius swaging portion, as has heretofore been the custom, the metal of the tooth is not evenly swaged throughout the length of the front face F, (as shown in Fig. 3) but (as shown in Fig. 4), when the die has been carried through its full stroke, a portion of the tooth metal, which has been pressed back radially by the die, springs back radially so that the front face of the swaged tooth comprises a short fully swaged surface F just back of the tip, and a surface F' joining the rear or lower end of surface F at the ridge Y. The result of this imperfect swaging is that the metal is not sufficiently crowded forwardly to produce full width at the cutting edge and is not sufficiently displaced laterally at the base of the swage to produce a long backing wedge.

When the tooth is swaged by a fully relieved die the cutting gauge $g$ (lateral spread at the cutting edge) is several thousandths $g''$ less than the gauge $g'$ produced by my die and the wedge angle is more abrupt.

On the other hand, with a die having the characteristics of my new die wherein the relief at the part 70—71 is only sufficient to afford substantially lessened frictional resistance, while at the same time resisting full spring-back of the metal in the arc F', I am able to produce, by an easily and accurately exertable force, a tooth, as shown in Fig. 3, having a smooth, unridged, front face, an extra gauge cutting tip and a long backing wedge.

I claim as my invention:

1. A swage comprising a main body transversely slotted to receive the toothed edge of a saw and provided with a pair of aligned bearings on opposite sides of the slot at the root thereof, an anvil slidably mounted in the main body at the root of the slot in the plane thereof, saw clamping means carried by the main body, and a die projected through the bearings and supported thereby across the body slot in opposition to the anvil, said die having circumferential contact with the bearings over an arc of substantially more than 180° and having, between its ends, in opposition to the anvil, a swaging-cam surface subtended to the rear by a circular swaging arc of full-radius and having an angular extent of several degrees but substantially less than the amplitude of swaging stroke, said full-radius surface being subtended toward the rear by a reduced-radius surface having an angular extent approximating the difference between the angle of full swaging stroke and the arc of full-radius swaging surface, the maximum radial reduction of said reduced-radius surface being less than the inherent spring-back of the saw tooth metal following the full effect of said full-radius swaging surface.

2. A swage comprising a main body transversely slotted to receive the toothed edge of a saw and provided with a pair of aligned bearings on opposite sides of the slot at the root thereof, an anvil slidably mounted in the main body at the root of the slot in the plane thereof, saw clamping means carried by the main body, and a die projected through the bearings and supported thereby across the body slot in opposition to the anvil, said die having circumferential contact with the bearings over an arc of substantially more than 180° and having, between its ends, in opposition to the anvil, a swaging-cam surface subtended to the rear by a circular swaging arc of full-radius and having an angular extent of several degrees but substantially less than the amplitude of swaging stroke, said full-radius surface being subtended toward the rear by a reduced-radius surface having an angular extent approximating the difference between the angle of full swaging stroke and the arc of full-radius swaging surface, said reduced-radius surface comprising an initial portion radially reduced approximately at the rate of 0.001 inches per degree subtended by uniform reduced-radius surface, the total reduced-radius surface having an angular extent approximately at least as much as the difference between the full swaging stroke and the full-radius swaging surface and the maximum radial reduction being not greater than 0.010 inches.

3. As an article of manufacture, a saw swaging die having a cross section, intermediate its ends comprising a gradually increasing-radius swaging cam surface, subtended by a full-radius swaging surface having a circumferential extent substantially less than full swaging stroke and subtended by a reduced-radius surface having an angular extent approximating full swaging stroke less the angular extent of the full-radius swaging surface and a maximum radial reduction less than full spring-back of saw tooth metal under the full action of said full-radius swaging surface, and subtended by a full-radius surface, the total circumferential distance from the initial end of the first-mentioned full-radius surface to the opposite extreme of the second-mentioned full-radius surface exceeding 180°.

4. As an article of manufacture, a saw swaging die having a cross section, intermediate its ends comprising a gradually increasing-radius swaging cam surface, subtended by a full-radius swaging surface having a circumferential extent substantially less than full swaging stroke and subtended by a reduced-radius surface having an angular extent approximating full swaging stroke less the angular extent of the full-radius swaging surface and a maximum radial reduction less than full spring-back of saw tooth metal under the full action of said full-radius swaging surface.

5. As an article of manufacture, a saw swaging die having a cross section, intermediate its ends comprising a gradually increasing-radius swaging cam surface, subtended by a full-radius swaging surface having a circumferential extent substantially less than full swaging stroke and subtended by a surface radially decreasing approximately at the rate of 0.001 inches per degree and merging into a uniform decreased-radius surface, the angular extent of said decreased-radius surface approximating full swaging stroke less than angular extent of the full-radius swaging surface and the maximum radial reduction being not more than 0.010 inches, said last-mentioned reduction-radius surface being subtended by a full-radius surface having a circumferential extent which places its farther end more than 180° from the initial end of the full-radius swaging surface.

6. As an article of manufacture, a saw swaging die having a cross section, intermediate its ends comprising a gradually increasing-radius swaging cam surface, subtended by a full-radius swaging surface having a circumferential extent substantially less than full swaging stroke and subtended by a surface radially decreasing approximately at the rate of 0.001 inches per degree and merging into a uniform decreased-radius surface, the angular extent of said decreased-radius surface approximating full swaging stroke less than angular extent of the full-radius swaging surface and the maximum radial reduction being not more than 0.10 inches.

DEWEY E. GOMMEL.